O. A. BOEHM.
BRACKET.
APPLICATION FILED AUG. 23, 1913.
1,096,282.
Patented May 12, 1914.
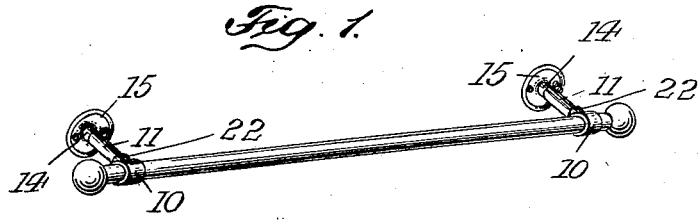
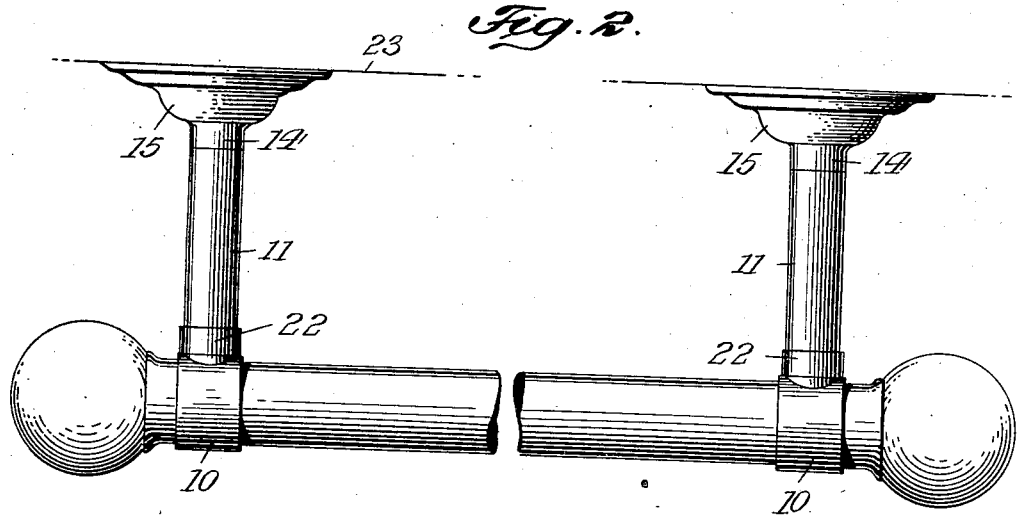
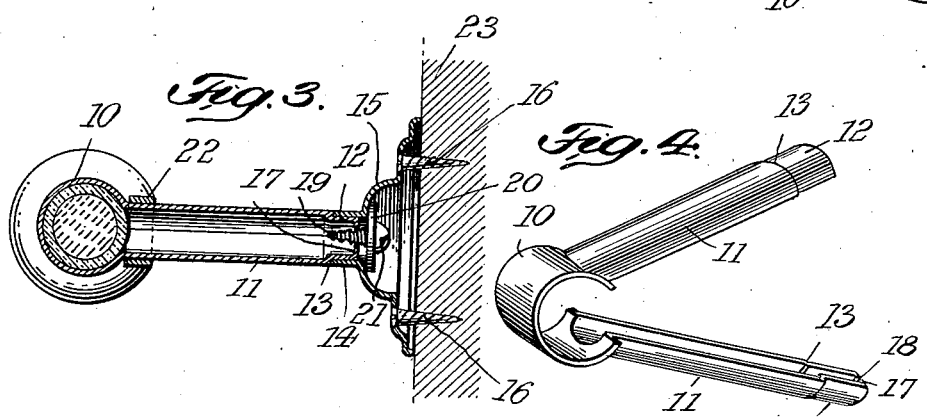
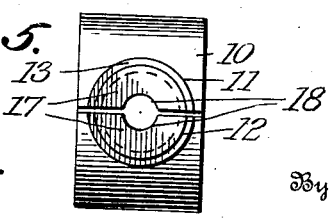
Witnesses:
Inventor
Oscar A. Boehm
By his Attorneys
Briesen & Zumpe

UNITED STATES PATENT OFFICE.

OSCAR A. BOEHM, OF NEW YORK, N. Y., ASSIGNOR TO SANI-GLASS MANUFACTURING COMPANY, OF VERONA, NEW JERSEY.

BRACKET.

1,096,282.  Specification of Letters Patent.  Patented May 12, 1914.

Application filed August 23, 1913. Serial No. 786,245.

*To all whom it may concern:*

Be it known that I, OSCAR A. BOEHM, a citizen of the United States, residing at New York city, county and State of New York, have invented a new and Improved Bracket, of which the following is a specification.

This invention relates to a bracket of novel construction which is more particularly adapted for supporting a towel rack such as for instance described in a co-pending patent application filed by me on Feb. 26, 1912 under Serial Number 679,901. This towel rack is provided with decorative end knobs of a diameter which exceeds that of the rack rod so that an endwise slipping of a bracket on said rod is prohibited. My novel brackets are so constructed that they may be quickly secured to such towel racks and to the wall, and that an accidental disengagement of the parts is effectively prevented.

In the accompanying drawing: Figure 1 is a perspective view of a pair of brackets embodying my invention, showing them applied to a towel rack; Fig. 2 an enlarged plan, partly broken away, of Fig. 1; Fig. 3 a section on line 3—3, Fig. 1; Fig. 4 a perspective view of the clamp, showing it partly opened, and Fig. 5 an enlarged end view of the clamp showing it collapsed.

My improved bracket comprises essentially a clamp which is composed of a split springy ring 10 and of a pair of opposed semitubular sections 11 which sections jointly constitute the bracket arm, the parts 10 and 11 being preferably stamped out of a single piece of sheet metal. At their free ends, sections 11 are reduced in diameter as indicated at 12 whereby a circumferential shoulder 13 is formed. The reduced ends 12 of the arm sections 11 are adapted to be received within the tubular sleeve 14 of a suitably shaped bulged disk 15 which may be secured to the wall by screws 16. The reduced ends 12 of arm sections 11 are provided with inwardly extending flanges 17 recessed as at 18. Recesses 18 are engaged by a screw 19 that tends to hold arm 11 to disk 15, a washer 20 being interposed between the screw head 21 and the bulged central portion of disk 15.

In use, the arm sections 11 of each clamp are spread to correspondingly open ring 10 and permit the latter to be sprung over the towel rack 22. Sections 11 are then bent toward each other and may be maintained in their collapsed state by means of a ring 22 slipped over said sections. The reduced arm section 12 is next inserted into sleeve 14 and screw 19 is tapped into the recessed arm flanges 17, until shoulder 13 is firmly drawn against the outer edge of sleeve 14, the washer 20 being interposed between the screw head 21 and the central bulged portion of disk 15. Disks 15 are finally, by screws 16, secured to the wall 23 or to another suitable support.

I claim:

1. A bracket of the character described, comprising a springy split ring, a pair of collapsible semitubular arm sections projecting laterally from said ring and having reduced flanged ends, a bulged disk having a central sleeve adapted for the reception of said reduced ends, and a screw adapted to engage the flanges of the arm-ends, whereby said sections are securely held to said disk.

2. A bracket of the character described, comprising a springy split ring, a pair of collapsible semitubular arm sections projecting laterally from said ring and having reduced flanged ends, a tightening ring adapted to be slipped over said sections, a bulged disk having a central sleeve adapted for the reception of the reduced arm-ends, and a screw adapted to engage the flanges of the arm-ends, whereby said sections are securely held to said disk.

OSCAR A. BOEHM.

Witnesses:
ARTHUR E. ZUMPE,
FRIEDA ELMAN.

Copies of this patent may be obtained for five cents each, by addressing the "Commissioner of Patents, Washington, D. C."